United States Patent

Ishizuki et al.

[11] Patent Number: 5,156,061
[45] Date of Patent: Oct. 20, 1992

[54] SHIFT DEVICE FOR AUTOMOTIVE AUTOMATIC TRANSMISSION

[75] Inventors: Masaharu Ishizuki, Zama; Norio Togano, Kosai, both of Japan

[73] Assignees: Nissan Motor Co., Ltd.; Fuji Kiko Co., Ltd., both of Japan

[21] Appl. No.: 636,847

[22] Filed: Jan. 2, 1991

[30] Foreign Application Priority Data

Jan. 10, 1990 [JP] Japan .................................... 2-4360

[51] Int. Cl.$^5$ .......................... B60K 20/00; F16C 1/12
[52] U.S. Cl. ...................................... 74/475; 74/501.6; 74/538
[58] Field of Search ..................... 74/475, 500.5, 501.6, 74/538

[56] References Cited

U.S. PATENT DOCUMENTS

| | | | |
|---|---|---|---|
| 3,766,799 | 10/1973 | DeSloovere | 74/475 |
| 3,998,109 | 12/1976 | O'Brien | 74/501.6 X |
| 4,365,522 | 12/1982 | Kubota et al. | 74/475 |
| 4,566,349 | 1/1986 | Van der Loon et al. | 74/475 |
| 4,649,766 | 3/1987 | Kiekhaefer | 74/475 |
| 4,850,238 | 7/1989 | Inoue | 74/473 R |

FOREIGN PATENT DOCUMENTS

| | | |
|---|---|---|
| A1 0289754 | 3/1988 | European Pat. Off. . |
| 3048093 | 12/1980 | Fed. Rep. of Germany . |
| 3744761 | 8/1987 | Fed. Rep. of Germany . |
| 60-195225 | 12/1985 | Japan . |

Primary Examiner—Allan D. Herrmann
Assistant Examiner—David W. Laub
Attorney, Agent, or Firm—Lowe, Price, Leblanc & Becker

[57] ABSTRACT

A bell crank lever is used to operatively interconnect a transmission control cable with a shift lever. The bell crank lever is pivoted about an axis which is located at essentially the same level but separate from the axis about which the shift lever is pivotal. Connection between the shift lever and the bell crank lever is achieved by means of a pin which projects from one side of a shaft which forms part of a detent mechanism, and an elongate slot formed in one end of the bell crank lever.

The bell crank lever is pivotally mounted on a plate which forms part of the detent mechanism and in which detent recesses are formed. This facilitates the accurate assembly of the device. Further, as the bell crank lever is pivoted at substantially the same height as the pivot shaft of the shift lever and arranged above the bottom wall of the base bracket, a lever effect equal to that of the conventional construction is achieved. Furthermore, since there is no need for an intermediate shaft, reduction in play and cost are also achieved.

6 Claims, 2 Drawing Sheets

SHIFT DEVICE FOR AUTOMOTIVE AUTOMATIC TRANSMISSION

BACKGROUND OF THE INVENTION

1. Field of the Invention

The present invention relates generally to a shift lever construction for an automatic transmission, and more specifically to a shift lever construction which features an improved shift feel to a user.

2. Description of the Prior Art

One example of conventional floor-mounted shift devices for an automatic transmission is disclosed in JP-A-60-195225.

However, with this arrangement, the pivot point of a bellcrank lever which transmits an operating force to a control cable of the automatic transmission, is positioned below both the pivot point of a shift lever and a base bracket face. Thus, in order to increase the lever effect, it is necessary to use an intermediate link to operatively connect one end of the bellcrank with the shift lever.

Due to the provision of the intermediate link, an undesirable amount of play tends to occurs at the connections and the operation feeling experienced by a user is consequently deteriorated. Furthermore, due to the increase in number of parts, both the weight of the device and the production cost are increased.

SUMMARY OF THE INVENTION

In view of the above-mentioned drawbacks, it is an object of the present invention to provide a shift device which assures a lever effect equal to that of a conventional construction, which reduces both undesirable play and production cost, and assures positional accuracy during the construction of the device.

The above object is achieved by an arrangement wherein a bell crank lever is used to operatively interconnect a transmission control cable with a shift lever. The bell crank lever is pivoted about an axis which is located at essentially the same level as the axis about which the shift lever is pivotal but separated therefrom. Connection between the shift lever and the bell crank lever is achieved by means of a pin which projects from one side of a shaft which forms part of a detent mechanism and an elongate slot formed in one end of the bell crank lever.

An additional feature of the invention is that the bell crank lever is pivotally mounted on a plate which forms part of the detent mechanism and in which detent recesses are formed. This facilitates accurate assembly of the device. Further, as the bell crank lever is pivoted at substantially the same height as the pivot shaft of the shift lever and is arranged above the bottom wall of the base bracket, a lever effect equal to that of the conventional construction is achieved. Furthermore, since there is no need for an intermediate shaft, reduction in play and cost are also achieved.

More specifically, the present invention is deemed to comprise a shift device for an automatic transmission which features: a base bracket, the base bracket having a base member from which an essentially vertical side wall extends, the base bracket being adapted for connection to a vehicle body; a shift lever; a pivot shaft to which the shift lever is fixedly connected, the pivot shaft being pivotally mounted on the side wall of the base bracket; a check holder which is rigid with the pivot shaft; a position plate which is arranged to extend parallel with the direction in which the shift lever is pivotal, the position plate having positioning recesses in which a position pin operatively mounted on the shift lever is detachably engageable; a check ball which is supported on a free end of the check holder and is detachably engageable in the positioning recesses; and lever means for transmitting an operating force from the shift lever to a control cable of the automatic transmission, the lever means being pivoted about an axis which is located at essentially the same level as the pivot shaft and arranged above a bottom wall of the base bracket.

BRIEF DESCRIPTION OF THE DRAWINGS

FIGS. 1 and 2 are drawings showing a preferred embodiment of the present invention, in which FIG. 1 is a perspective view and FIG. 2 is a vertically sectioned view.

DETAILED DESCRIPTION OF THE PREFERRED EMBODIMENT

Figure 1:
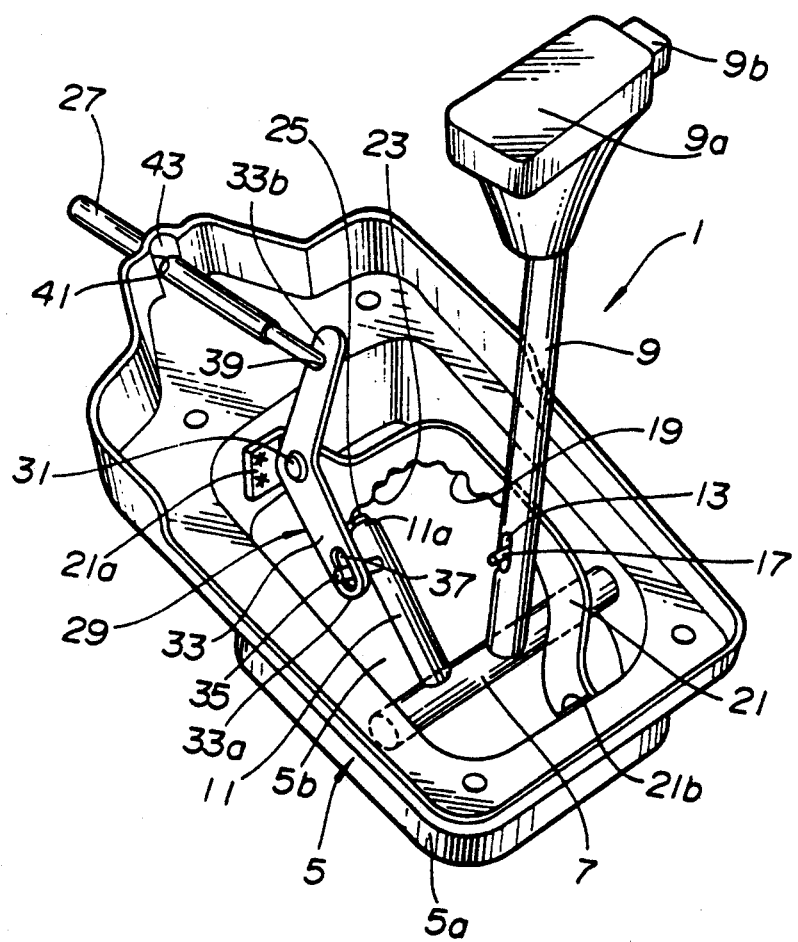
Figure 2:
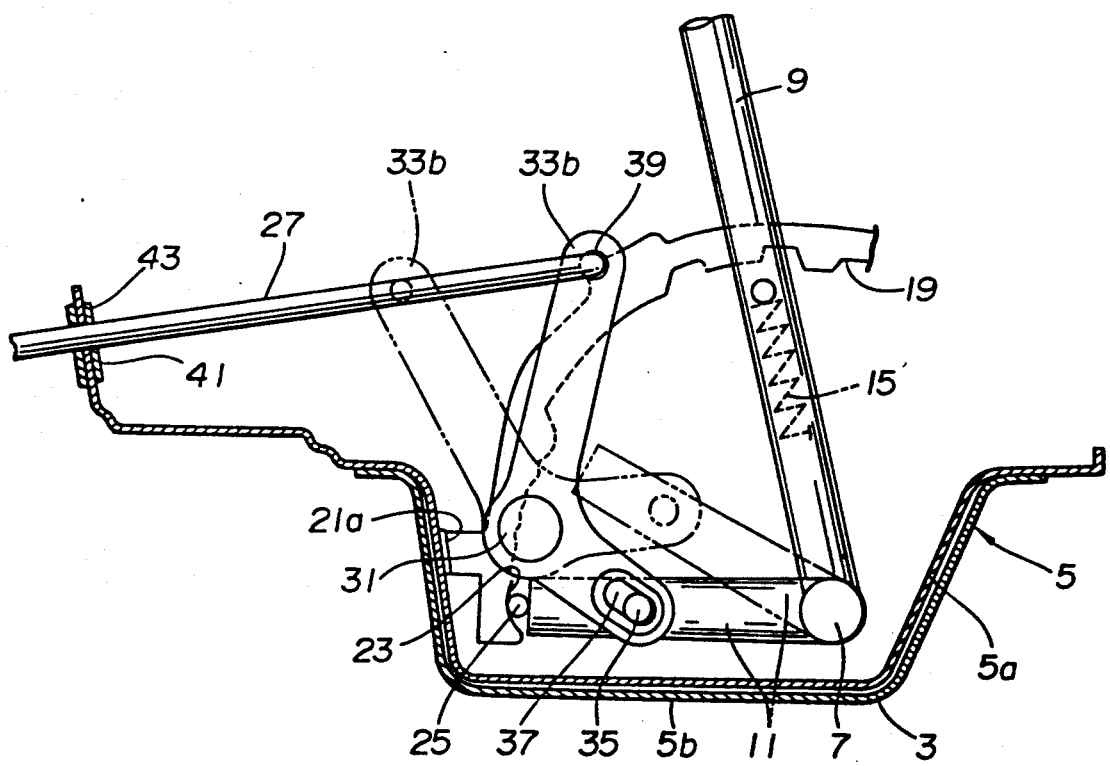

FIGS. 1 and 2 show a preferred embodiment of the present invention. Designated by numeral 1 is a shift lever for an automatic transmission. The shift lever arrangement 1 comprises a shift lever 9 which is supported by way of a pivot shaft 7 on the vertical side wall 5a of a pan-shaped base bracket 5 fixed to a floor panel 3 of a vehicle body. A detent mechanism includes a check holder 11 which extends from the pivot shaft 7 and which is pivotally movable in accordance with the pivotal movement of the shift lever 9, and a position plate 21 which extends along a plane which is normal to the axis about which the shift lever is pivotal, and thus parallel with the the direction in which the shift lever 9 is movable. The position plate 21 has front and rear flanges 21a and 21b secured to the fore and aft vertical end wall 5a of the base bracket 5 and is formed with notches 19 in which a position pin 17 are receivable. The position pin 17 is vertically movable along an elongate slot formed in the shift lever 9 and constantly biased upward by a spring 15.

A check ball 25 is supported on a free end 11a of the check holder 11 and is detachably engageable with check portions 23 defined by the notches 19.

A force transmission means 29 is arranged such that, upon pivotal movement of the check holder 11, force is transmitted to control cable 27 of the automatic transmission (not shown).

A pivot shaft of a force transmission means 29 is positioned at approximately the same height as the pivot shaft 7 of the shift lever 9 and is arranged above a bottom wall 5b of the base bracket 5. Upon manipulation of a button 9b mounted to a knob 9a of the shift lever 9, the position pin 17 is moved downwardly in a manner which disengages the same from the neutral position (N), drive position (D), etc., i.e., from corresponding notches or positioning recesses 19 of the position plate 21. After the shift lever 9 is moved either forward or rearward and the force applied to the button 9b is removed, the position pin 17 moves upward under the bias of spring 15 and engages in a newly selected position (for example, parking position (P), second position (S), etc.,).

In this embodiment the transmission means 29 comprises a bellcrank lever 33 which is pivotally supported by the pivot shaft 31 supported by the position plate 21. One end portion 33a of the lever 33 is formed with an elongate slot 37 in and along which a pin 35, which projects from a side portion of the check holder 11, is slidably engaged, and the other end portion 33b of the supporting plate 33 is formed with an opening 39 to which the control cable 27 is pivotally connected. A grommet 43 which supports the control cable 27, is fitted in a recess 41 formed in the vertical wall 5a of the base bracket 5.

Since the pivot shaft 31 of the transmission means 29 is positioned at substantially the same height as the pivot shaft 7 of the shift lever 9, and arranged above the bottom wall 5b of the base bracket 5, a lever effect equal to that of the conventional construction is obtained. Furthermore, since the pivot shaft 32 is connected to the position plate 21, the ease and precision with which assembly can be carried out is increased.

In addition to the above, the depth of the device is minimized, and thus alleviating road clearance related design problems.

In this disclosure, there are shown and described only the preferred embodiments of the invention, but, as aforementioned, it is to be understood that the invention is capable of use in various other combinations and environments and is capable of changes or modifications within the scope of the inventive concept as expressed herein.

What is claimed is:

1. A shift device for an automatic transmission, comprising:
   a base bracket, said base bracket having a base member from which an essentially vertical side wall extends, the base bracket being adapted for connection to a vehicle body;
   a shift lever, said shift lever being pivotable about a first axis;
   a pivot shaft to which said shift lever is fixedly connected, the pivot shaft being pivotally mounted on the side wall of said base bracket;
   a check holder which is rigid with the pivot shaft;
   a position plate which is arranged to extend parallel with the direction in which the shift lever is pivotal, the position plate having positioning recesses in which a position pin operatively mounted on said shift lever is detachably engageable;
   a check ball which is supported on a free end of the check holder and is detachably engageable in the positioning recesses; and
   lever means for transmitting an operating force from said shift lever to a control cable of the automatic transmission, said lever means being pivoted about a second axis which is located at essentially the same level as and separate from the first axis about which the pivot shaft is pivotable, the second axis being arranged above a bottom wall of the base bracket.

2. A shift device for an automatic transmission, comprising;
   a base bracket, said base bracket having a base member from which an essentially vertical side wall extends, the base bracket being adapted for connection to a vehicle body;
   a shift lever;
   a pivot shaft to which said shift lever is fixedly connected, the pivot shaft being pivotally mounted on the side wall of said base bracket;
   a check holder which is rigid with the pivot shaft;
   a position plate which is arranged to extend parallel with the direction in which the shift lever is pivotal, the position plate having positioning recesses in which a position pin operatively mounted on said shift lever is detachably engageable;
   a check ball which is supported on a free end of the check holder and is detachably engageable in the positioning recesses and
   lever means for transmitting an operating force from said shift lever to a control cable of the automatic transmission, said lever means being pivoted about an axis which is located at essentially the same level as the pivot shaft and is arranged above a bottom wall on the base bracket, wherein:
   said lever means comprises a bell crank lever, said bell crank lever being pivotable about a second axis and having a first end operatively connected with the transmission control cable and a second end operatively connected with said check holder.

3. A shift device as claimed in claim 2, wherein:
   the operative connection between the second end of said bell crank lever and the check holder is achieved by means defining an elongate slot in one of said bell crank lever and said check holder, and a pin which is rigid with the other of said bell crank lever and said check holder.

4. A shift device as claimed in claim 2, wherein:
   said bell crank lever is pivotably supported on said position plate.

5. A shift device as claimed in claim 1, wherein:
   said lever means is arranged to pivot about said second axis in a first rotational direction when said shift lever pivots about said first axis in a second and opposite rotational direction.

6. A shift device as claimed in claim 1, wherein:
   the second axis is located at the same level or higher than the first axis and is parallel thereto.

* * * * *